(12) United States Patent
Chen et al.

(10) Patent No.: US 9,104,382 B2
(45) Date of Patent: Aug. 11, 2015

(54) DUAL LEAF PORTABLE ELECTRONIC DEVICE WITH BIASABLE DISPLAY SCREEN LOCK MEANS

(71) Applicant: Chin-Hsing Horng, Kueishan Hsiang, Taoyuan (TW)

(72) Inventors: Ching-Yao Chen, Taoyuan (TW); Shih-Pin Yang, Taoyuan (TW)

(73) Assignee: Chin-Hsing Horng, Taoyuan (TW)

( * ) Notice: Subject to any disclaimer, the term of this patent is extended or adjusted under 35 U.S.C. 154(b) by 106 days.

(21) Appl. No.: 13/961,744

(22) Filed: Aug. 7, 2013

(65) Prior Publication Data

US 2015/0043143 A1    Feb. 12, 2015

(51) Int. Cl.
*G06F 1/16* (2006.01)

(52) U.S. Cl.
CPC .................................... *G06F 1/1681* (2013.01)

(58) Field of Classification Search
CPC ............ H05K 7/00; G06F 1/16; G06F 1/1681
USPC .......................... 361/679.27, 679.01–679.45, 361/679.55–679.61, 724–727; 455/575.1, 455/347, 575.2, 575.3, 575.5; 16/369–902
See application file for complete search history.

(56) References Cited

U.S. PATENT DOCUMENTS

| | | | |
|---|---|---|---|
| 4,960,256 A * | 10/1990 | Chihara et al. | 248/286.1 |
| 6,246,585 B1 * | 6/2001 | Gunther et al. | 361/759 |
| 6,771,494 B2 * | 8/2004 | Shimano | 361/679.06 |
| 6,915,562 B2 * | 7/2005 | Joist et al. | 29/758 |
| 7,065,835 B2 * | 6/2006 | Kuramochi | 16/357 |
| 7,903,400 B1 * | 3/2011 | Chen et al. | 361/679.27 |
| 8,023,283 B2 * | 9/2011 | Cheng et al. | 361/801 |
| 8,050,030 B2 * | 11/2011 | Wu et al. | 361/679.58 |
| 8,096,627 B2 * | 1/2012 | Lin | 312/325 |
| 8,108,970 B2 * | 2/2012 | Huang | 16/337 |
| 8,243,430 B2 * | 8/2012 | Ahn et al. | 361/679.27 |
| 8,363,391 B2 * | 1/2013 | Kim et al. | 361/679.01 |
| 8,416,568 B2 * | 4/2013 | Tian et al. | 361/679.55 |
| 8,428,663 B2 * | 4/2013 | Sano et al. | 455/575.1 |
| 8,579,508 B2 * | 11/2013 | Mai et al. | 384/26 |
| 8,687,355 B2 * | 4/2014 | Hsu et al. | 361/679.27 |
| 8,713,758 B2 * | 5/2014 | Mitsui et al. | 16/357 |
| 2005/0168925 A1 * | 8/2005 | Fang et al. | 361/683 |
| 2005/0236869 A1 * | 10/2005 | Ka et al. | 296/192 |
| 2007/0090249 A1 * | 4/2007 | Lu et al. | 248/291.1 |
| 2008/0189908 A1 * | 8/2008 | Lowry et al. | 16/231 |
| 2008/0263827 A1 * | 10/2008 | Hsu et al. | 16/362 |
| 2009/0095872 A1 * | 4/2009 | Chiang | 248/479 |
| 2009/0227301 A1 * | 9/2009 | Lindvall | 455/575.4 |
| 2010/0000052 A1 * | 1/2010 | Chung | 16/364 |
| 2011/0023272 A1 * | 2/2011 | Huang | 16/362 |
| 2012/0137471 A1 * | 6/2012 | Kujala | 16/382 |

\* cited by examiner

*Primary Examiner* — Courtney Smith
*Assistant Examiner* — Rashen E Morrison

(57) ABSTRACT

A dual leaf portable electronic device includes a base member having hinges mounted in a frame shell thereof, a top cover including a bracket and a display screen pivotally coupled to the bracket and having positioning holes on a bottom side thereof and respectively aimed at respective locating holes on the bracket, and positioning devices each including a movable latch having a coupling base pivotally coupled to one respective hinge at an eccentric location and a latch body extended from the coupling base and insertable through one respective locating hole of the bracket into one respective positioning hole of the display screen to lock the display screen to unlock the display screen from the bracket.

2 Claims, 4 Drawing Sheets

DUAL LEAF PORTABLE ELECTRONIC DEVICE WITH BIASABLE DISPLAY SCREEN LOCK MEANS

BACKGROUND OF THE INVENTION

1. Field of the Invention

The present invention relates to dual leaf portable electronic devices and more particularly, to a dual leaf portable electronic device with biasable display screen lock means, which uses positioning devices to lock the display screen to a bracket and to prevent friction between the display screen and the frame shell of the base member when the user open the dual leaf portable electronic device, and to unlock the display screen from the bracket for enabling the user to bias the display screen relative to the bracket and the base member after the dual leaf portable electronic device is opened to a predetermined angle.

2. Description of the Related Art

Notebook computers, electronic dictionaries, PDAs and many other dual leaf portable electronic devices are commercially available. These dual leaf portable electronic devices common comprise a base member, and a display screen hinged to the base member and can be opened from or closed on the base member, facilitating carrying and storage.

In order to expand the visible range of the display screen, notebook computers with a turnable display screen have been created and have appeared on the market. Taiwan Patent No. M398316 discloses a similar design, which uses hinge means to pivotally connect a U-shaped bracket to a base member for supporting a display screen, allowing the display screen to be biased relative to the U-shaped bracket. However, when opening a notebook computer, the most convenient way is to let the user directly lift the display screen from the base member. However, because the display screen is pivotally coupled to the U-shaped bracket in the aforesaid prior art design, the bottom side of the display screen will be forced to rub against the surface of the base member when the user opens the display screen from the base member, causing display screen damage. If the user directly pushes the U-shaped bracket to open the notebook computer, the operation will be inconvenient.

SUMMARY OF THE INVENTION

The present invention has been accomplished under the circumstances in view. It is the main object of the present invention to provide a dual leaf portable electronic device, which uses positioning devices to lock/unlock the display screen, avoiding friction between the display screen and the base member when the user opens the display screen from the base member.

To achieve this and other objects of the present invention, adual leaf portable electronic device of the present invention comprises a base member, a top cover, and at least one positioning device. The base member comprises a frame shell, and at least one hinge mounted in one side of the frame shell. The top cover comprises a bracket and a display screen. The bracket comprises a narrow elongated base portion pivotally connected to the at least one hinge of the base member, at least one locating hole formed in the base portion, and two arms respectively extended from two opposite ends of the narrow elongated base portion at right angles. The display screen is pivotally coupled between the two arms of the bracket, having at least one positioning hole located on a bottom side thereof and respectively aimed at the at least one locating hole. Each positioning device comprises a movable latch. The movable latch comprises a coupling base pivotally coupled to one hinge of the base member at an eccentric location, and a latch body forwardly extended from the coupling base and inserted through one locating hole of the top cover into one respective positioning hole of the display screen to lock the display screen to said bracket. Biasing the bracket of the top cover relative to the at least one hinge in direction away from the frame shell of the base member causes movement of the latch body of the movable latch of each hinge gradually out of the respective locating hole to unlock the display screen from the bracket, enabling the display screen to be biased relative to the bracket.

Preferably, each positioning device further comprises a pivot rod axially connected to one end of one hinge of the base member at an eccentric location. Further, the movable latch of each positioning device comprises a coupling hole located on the coupling base thereof and pivotally and slidably coupled to the pivot rod of the respective positioning device.

Preferably, the coupling hole of the movable latch of each positioning device is an elongated hole.

DETAILED DESCRIPTION OF THE PREFERRED EMBODIMENT

Figure 1:
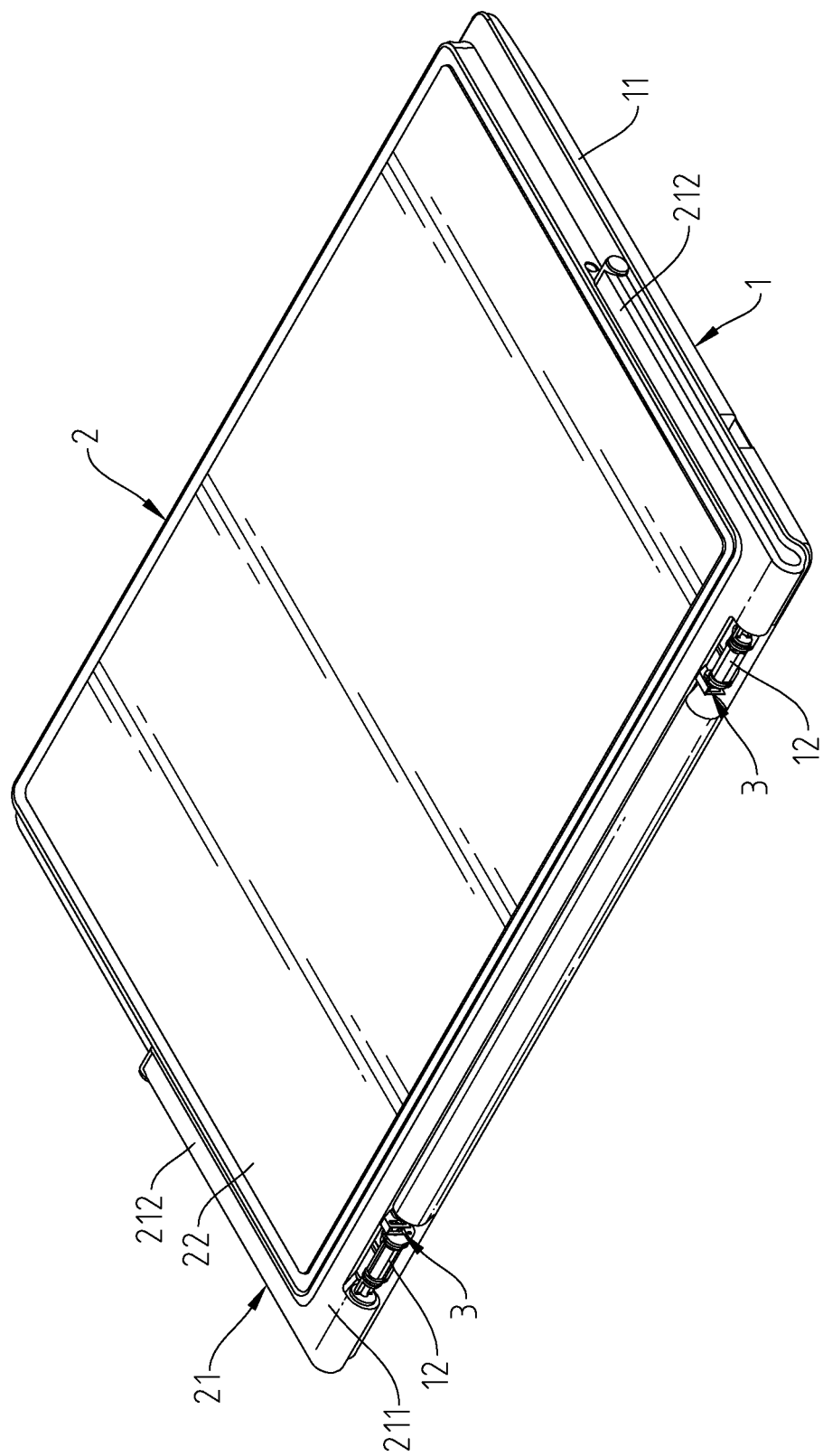
FIG. 1 is an oblique top elevational view of a dual leaf portable electronic device in accordance with the present invention.
Figure 2:
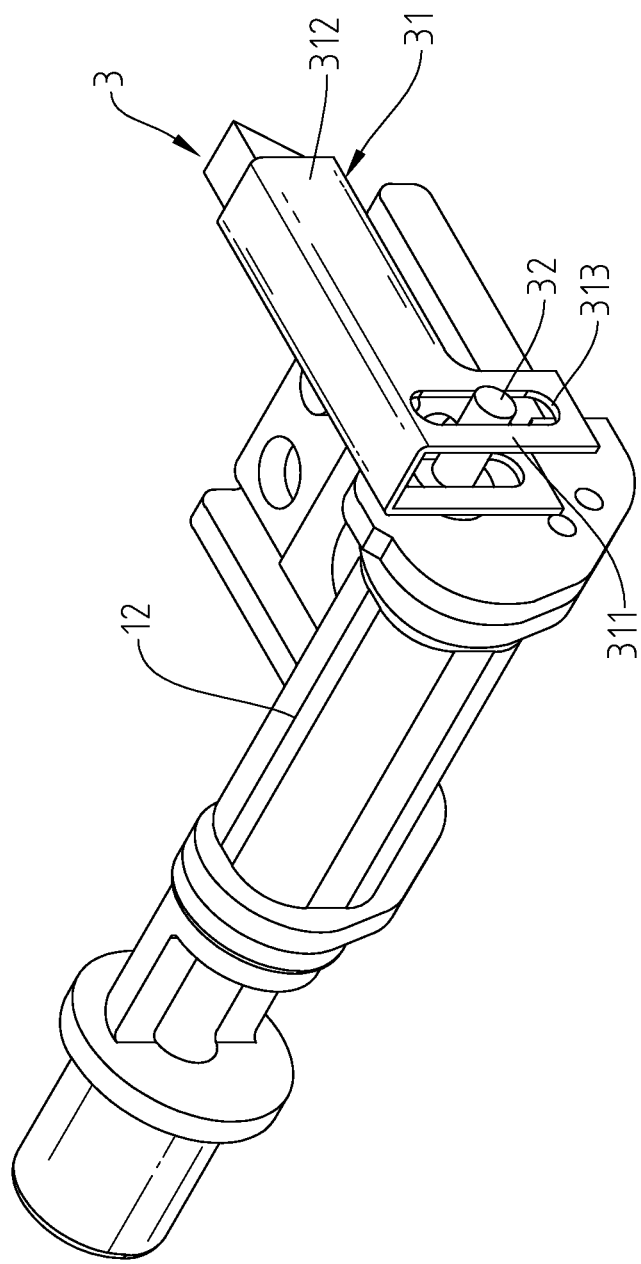
FIG. 2 is an elevational view, in an enlarged scale, of a part of the dual leaf portable electronic device in accordance with the present invention, illustrating the relationship between one positioning device and the respective hinge.
Figure 3:
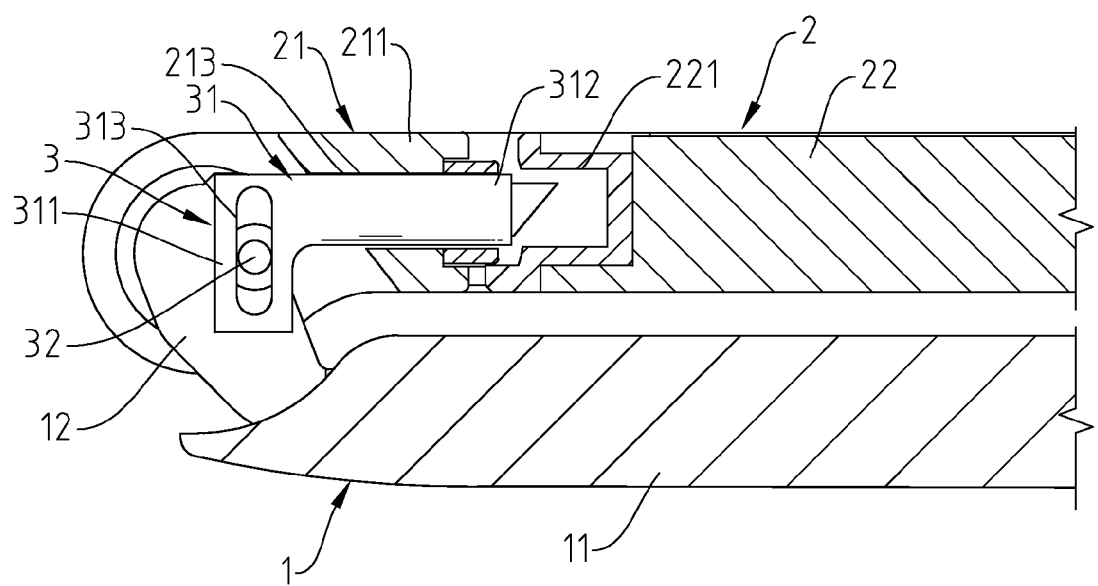
FIG. 3 is a schematic sectional view illustrating a status of use of the dual leaf portable electronic device in accordance with the present invention (I).

Referring to FIGS. 1-3, a dual leaf portable electronic device in accordance with the present invention is shown. The dual leaf portable electronic device comprises a base member 1, a cover member 2, and at least one, for example, two positioning devices 3.

The base member 1 comprises a frame shell 11, and at least one, for example, two hinges 12 mounted in one side of the frame shell 11.

The top cover 2 comprises a bracket 21 and a display screen 22. The bracket 21 comprises a narrow elongated base portion 211 pivotally connected to the hinges 12 of the base member 1, at least one, for example, two locating holes 213 formed in the base portion 211, and two arms 212 respectively extended from two opposite ends of the narrow elongated base portion 211 at right angles. The display screen 22 is pivotally coupled between the two arms 212 of the bracket 21, having at least one, for example, two positioning holes 221 located on a bottom side thereof and respectively aimed at the locating holes 213.

Each positioning device 3 comprises a movable latch 31 and a pivot rod 32. The pivot rod 32 is axially connected to one end of one hinge 12 of the base member 1 at an eccentric location. The movable latch 31 comprises a coupling base 311, a latch body 312 forwardly extended from the coupling base 311, and a coupling hole 313 located on the coupling base 311 and pivotally coupled to the pivot rod 32 to pivotally secure the coupling base 311 to the associating hinge 12 of the base member 1 for enabling the latch body 312 to be inserted through one locating hole 213 of the bracket 21 and the respective positioning hole 221 of the display screen 22. Further, the coupling hole 313 of the movable latch 31 is an elongated hole.

Figure 4:
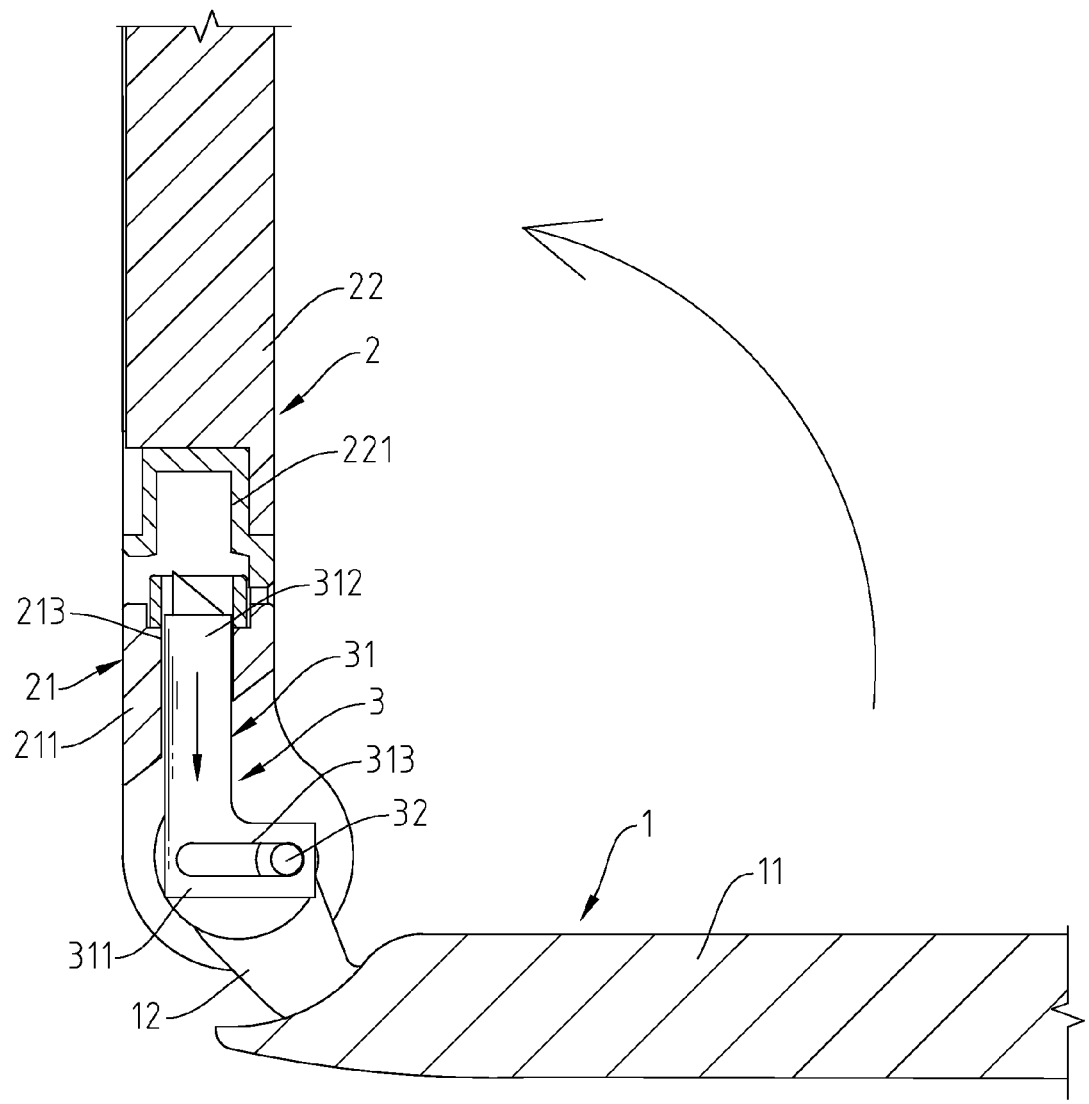
FIG. 4 is a schematic sectional view illustrating a status of use of the dual leaf portable electronic device in accordance with the present invention (II).

Referring to FIG. 4 and FIGS. 1-3 again, when closing the top cover 2 on the base member 1, the latch body 312 of the positioning device 3 will be inserted through one respective locating hole 213 of the top cover 2 into one respective positioning hole 221 of the display screen 22 to lock the display screen 22 to the arms 212 of the bracket 21 of the top cover 2. If the user bias the display screen 22 of the top cover 2 in direction away from the frame shell 11 of the base member 1 at this time, the bracket 21 will be moved with the display screen 22 to bias the hinges 12 of the base member 1. Because the coupling hole 313 of the movable latch 31 of each positioning device 3 is coupled to the respective pivot rod 32, the coupling base 311 of the movable latch 31 will be deviated from the central axis of the respective hinge 12 to increase the distance between the positioning hole 221 of the display screen 22 and the respective pivot rod 32 during rotation of the movable latch 31, causing the latch body 312 of the movable latch 31 of each positioning device 3 to be moved out of the respective positioning hole 211 to unlock the display screen 22 from the bracket 21. At this time, the display screen 22 can be biased relative to the bracket 21. Similarly, when biasing the bracket 21 of the top cover 2 in direction toward the frame shell 11 of the base member 1, the distance between the positioning holes 221 of the display screen 22 and the respective pivot rods 32 will be gradually reduced, enabling the latch body 312 of the movable latch 31 of each positioning device 3 to be moved into the respective positioning hole 211 to unlock the display screen 22 to the bracket 21.

What is claimed is:

1. A dual leaf portable electronic device, comprising:
   a base member comprising a frame shell and at least one hinge mounted in one side of said frame shell;
   a top cover comprising a bracket and a display screen, said bracket comprising an elongated base portion pivotally connected to said at least one hinge of said base member, at least one locating hole formed in said base portion, and at least two arms respectively extended from two opposite ends of said elongated base portion at right angles, said display screen being pivotally coupled between said two arms of said bracket, having at least one positioning hole located on a bottom side thereof and respectively aimed at said at least one locating hole; and
   at least one positioning device each comprising a movable latch, said movable latch comprising a coupling base pivotally coupled to one said hinge of said base member at an eccentric location and a latch body forwardly extended from said coupling base and inserted through one said locating hole of said top cover into one respective said positioning hole of said display screen to lock said display screen to said bracket;
   wherein biasing said bracket of said top cover relative to said at least one hinge in a direction away from said frame shell of said base member causes movement of said latch body of said movable latch of each said hinge out of the respective said locating hole to unlock said display screen from said bracket for enabling said display screen to be biased relative to said bracket; and
   wherein each said positioning device further comprises a pivot rod axially connected to one end of one said hinge of said base member at an eccentric location; said movable latch of each said positioning device comprises a coupling hole located on the coupling base thereof and pivotally and slidably coupled to the pivot rod of the respective said positioning device.

2. The dual leaf portable electronic device as claimed in claim 1, wherein said coupling hole of said movable latch of each said positioning device is an elongated hole.

* * * * *